United States Patent [19]

Sato

[11] Patent Number: 4,772,410
[45] Date of Patent: Sep. 20, 1988

[54] FISHING LINE GUIDE DEVICE FOR A FISHING REEL

[75] Inventor: Jun Sato, Sakai, Japan

[73] Assignee: Shimano Industrial Company Limited, Osaka, Japan

[21] Appl. No.: 21,326

[22] Filed: Mar. 3, 1987

[30] Foreign Application Priority Data

Mar. 13, 1986 [JP] Japan ............................ 61-36866[U]

[51] Int. Cl.$^4$ ............................................. A01K 89/04
[52] U.S. Cl. ................................................. 242/84.42
[58] Field of Search ................. 242/84.41, 84.42, 158.3

[56] References Cited

U.S. PATENT DOCUMENTS

| | | | |
|---|---|---|---|
| 1,814,234 | 7/1931 | Thorpe | 242/84.42 |
| 2,314,032 | 3/1943 | Coxe et al. | 242/84.42 |
| 3,447,760 | 6/1969 | Sarah | 242/84.42 |

FOREIGN PATENT DOCUMENTS 57-141768 9/1982 Japan .

*Primary Examiner*—John M. Jillions
*Attorney, Agent, or Firm*—Stevens, Davis, Miller & Mosher

[57] ABSTRACT

A fishing line guide device is provided for a fishing reel. The guide device includes a tubular guide shaft, a level wind shaft having traverse grooves, and a fishing line guide which includes an outer guide member supported to the guide shaft such that it is axially movable in reciprocation thereon and an inner guide member supported to the level wind shaft such that it is axially movable in reciprocation thereon. Both guide members are coupled with each other so that they are non-rotatable with respect to the guide shaft and level wind shaft respectively. The inner guide member holds a slider having an engaging projection engageable with the traverse grooves.

5 Claims, 3 Drawing Sheets

FISHING LINE GUIDE DEVICE FOR A FISHING REEL

FIELD OF THE INVENTION

The present invention relates to a fishing line guide device for a fishing reel, and more particularly, to a fishing line guide device for a fishing reel, especially a double bearing reel, which moves a fishing line guide in reciprocation in the same direction as the axis of a spool at the fishing reel so as to guide a fishing line to be wound onto the spool.

BACKGROUND OF THE INVENTION

Generally, a kind of double bearing fishing reel, having a line guide device for example, as disclosed in Japanese Utitlity Model Laid-Open Gagette No. Sho 57-141,768, is so constructed that, between a pair of side frames for rotatably supporting the spool, a tubular guide shaft having a slit is provided in parallel to the axis of the spool, and a level wind shaft having traverse grooves is supported rotatably inside the guide shaft and associated with a drive mechanism for the spool. The fishing line guide which has a fishing line guide unit is supported at the outer periphery of the guide shaft in relation of being movable in reciprocation axial thereof, and a slider engageable with the traverse grooves is held by the fishing line guide. Rotation of the level wind shaft is transmitted to the fishing line guide through the traverse grooves and slider and the fishing line guide is moved in reciprocation to wind onto the spool a fishing line.

The conventional fishing line guide device, however, supports the fishing line guide at one support point to the guide shaft, so that when the fishing line guide is subjected to a large load, in other words, when a large fish is hooked, the guide shaft is subject to being deformed. Also, in order to increase the strength of the guide shaft, it is necessary to form a larger diameter guide shaft, whereby the fishing line guide also becomes larger, with the result that the fishing reel as a whole becomes large and heavy.

The fishing line guide, which is supported only to the guide shaft provided outside the level wind shaft as described above, may cause a large backlash between the fishing line guide and the guide shaft due to an error created when they are processed.

As a result, since the fishing line guide is largely inclined axially of the guide shaft, a load applied to the fishing line guide is transmitted from a part thereof to the guide shaft, thereby creating a problem in that the guide shaft has diminished durability.

Also, the guide shaft separate from the level wind shaft having the traverse grooves supports the fishing line guide holding thereon the slider engageable with the traverse grooves, whereby unless a thin adjusting plate or a spring is provided between the slider and the guide, the slider cannot be positioned accurately with respect to the traverse grooves.

SUMMARY OF THE INVENTION

An object of the invention is to provide a fishing line guide device for a fishing reel, which can improve the fishing line guide in its supporting construction without enlarging a diameter of the fishing line guide supporting shaft, minimize an axial inclination of the fishing line guide without increasing an axial length thereof, and ensure the positioning of the slider with respect to the traverse grooves without using any special member, such as an adjusting plate.

The present invention is characterized in that a fishing line guide device for a fishing reel comprises a tubular guide shaft, a level wind shaft which has traverse grooves and is supported inside the guide shaft, a fishing line guide comprising an outer guide member supported to the guide shaft slidably movably in reciprocation axial thereof and having at one side a fishing line guide unit, an inner guide member supported to the level wind shaft slidably movably in reciprocation axial thereof, a coupling means for coupling the outer guide member with the inner guide member to be non-rotatable relative to them respectively, and a slider having an engaging projection engageable with the traverse grooves and held to the inner guide member.

Thus, the fishing line guide constructed as described above provides increased supporting rigidity and minimizes axial inclination. Also, the slider, which is held to the inner guide member which in turn is supported to the lever wind shaft, can achieve proper positioning with respect to the traverse grooves without using an adjusting plate or the like.

The above and other objects of the invention will become more apparent in the detailed description and examples which follow.

DETAILED DESCRIPTION OF THE INVENTION

Figure 2:
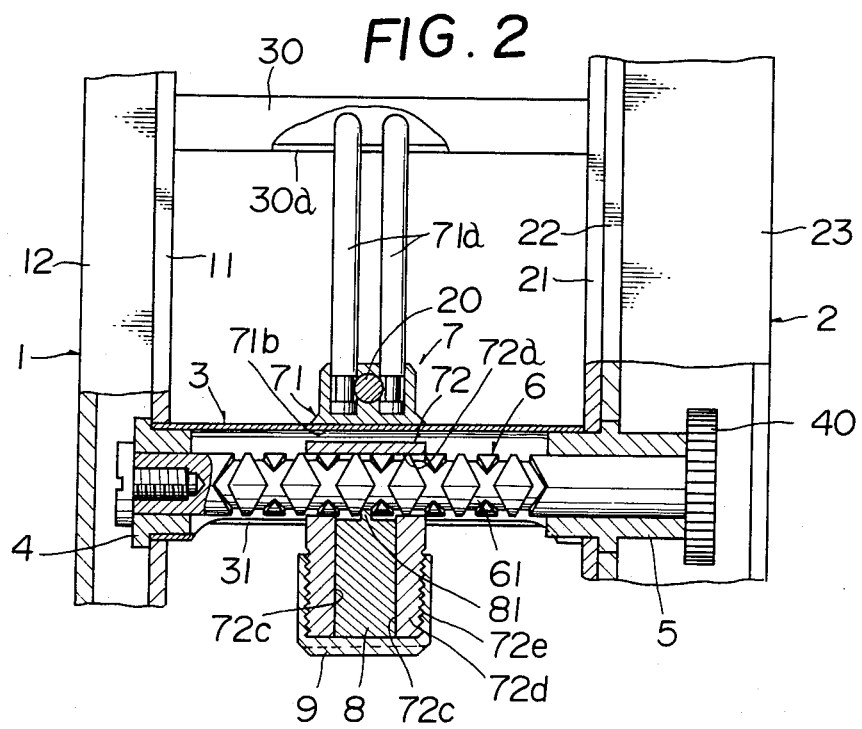
FIG. 2 is a partially cutaway front view of the FIG. 1 embodiment applied to a double bearing fishing reel.
Figure 3:
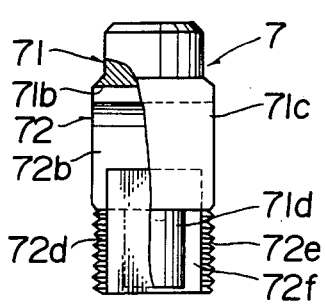
FIG. 3 is a partially cutaway front view of a fishing line guide only.
Figure 4:
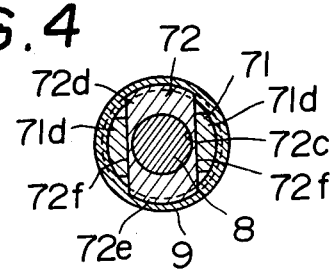
FIG. 4 is a sectional view taken on the line IV—IV in FIG. 1.
Figure 5:
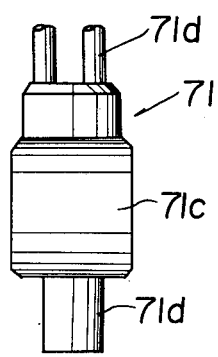
FIG. 5 is a front view of an outer guide member according to the invention.
Figure 6:
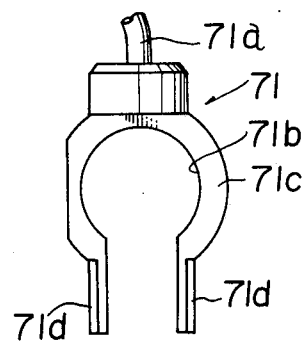
FIG. 6 is a side view of the outer guide member according to the invention.
Figure 7:
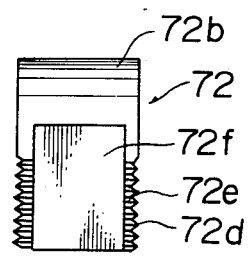
FIG. 7 is a front view of an inner guide member according to the invention.
Figure 8:
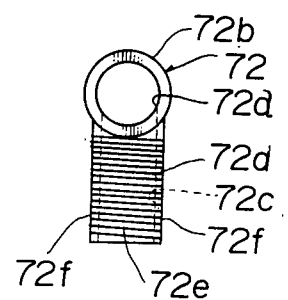
FIG. 8 is a side view of the inner guide member according to the invention.

FIG. 2 shows a double bearing fishing reel to which a fishing line guide device of the invention is applied. The double bearing fishing reel inuldes a reel body provided with a first side frame 1 comprising a side plate 11 and a cup-shaped cover 12 attached to the outside thereof; a second side frame 2 comprising a side plate 21, a doubling plate 22 attached to the outside thereof, and a cup-shaped cover 23 attached to the outside of the doubling plate 22; and a plurality of connecting rods for connecting the side frames 1 and 2. A spool shaft (not shown) having a spool (not shown) is supported rotatably between the first side frame 1 and the second side frame 2. A drive mechanism for transmitting rotation of a handle to the spool shaft is housed within the second side frame 2, and a clutch is provided between the drive mechanism and the spool shaft.

A first embodiment of the fishing line guide device of the present invention shown in FIGS. 1 through 8 is so constructed that a tubular guide shaft 3 having a slit 31 extending axially thereof is provided across the side frames 1 and 2 and in parallel to the axis of the spool. A level wind shaft 6 having at its outer periphery traverse grooves 61 is supported rotatably inside the guide shaft 3. An outer guide member 71 having a fishing line guide unit 71a is supported onto the outer periphery of guide shaft 3, and an inner guide member 72 is supported onto the outer periphery of level wind shaft 6 to be slidable in reciprocation axially of the shafts 3 and 6 respectively. Both guide members 71 and 72 are coupled with each other by a coupling means to be discussed below, such that they are non-rotatable relative to the tubular shaft 3 and level wind shaft 6 respectively to thereby form a fishing line guide 7. A slider 8 engageable with the traverse grooves 61 is held at the inner guide member 72.

In the above construction, the outer guide member 71, as shown in FIGS. 1, 2, 5 and 6, comprises a cylindrical portion 71c having a fitting bore 71b to be fitted axially slidably onto the outer periphery of the guide shaft 3, a fishing line guide unit 71a extending outwardly from one side of the cylindrical portion 71c, and a bifurcate portion 71d having outer peripheral portions and extending from the other side of cylindrical portion 71c reversely to the fishing line guide unit 71a. Cylindrical portion 71c and bifurcate portion 71d are made from synthetic resin and are integral with each other, and fishing line guide unit 71a is formed of two metal wire rods and is mounted detachably on the cylindrical portion 71c.

The inner guide member 72, as shown in FIGS. 1, 2, 7 and 8, comprises a cylindrical portion 72b having a fitting bore 72a to be fitted slidably onto the outer periphery of level wind shaft 6 and smaller in diameter than the cylindrical portion 71b at the outer guide member 71. Inner guide member 72 also includes holding portion 72d having a holding bore 72c in continuation of the fitting bore 72a and extending perpendicularly to the axis thereof. Holding portion 72d is provided at its outer periphery with screw threads 72e in part and with a pair of flat surfaces 72f abutting against the inner surfaces of the bifurcate portion 71d at the outer guide member 71.

The coupling meeans utilizes a cap 9 engageable with the screw threads 72e at the holding portion 72d. In detail, the bifurcate portion 71d is made long enough to cover the threaded position of the holding portion 72d screwable with the cap 9 and fitted onto the holding portion 72d to abut at the inner surfaces of the bifurcate portion 71d against the flat surfaces 72f at the holding portion 72d respectively. Cap 9 having a bottom surface to abut against the end face of the holding portion 72d screws with the partial threads 72e at the holding portion 72d, thereby coupling both the guide members 71 and 72 with each other so that they are non-rotatable relative to the guide shaft 3 and level wind shaft 6.

Figure 9:
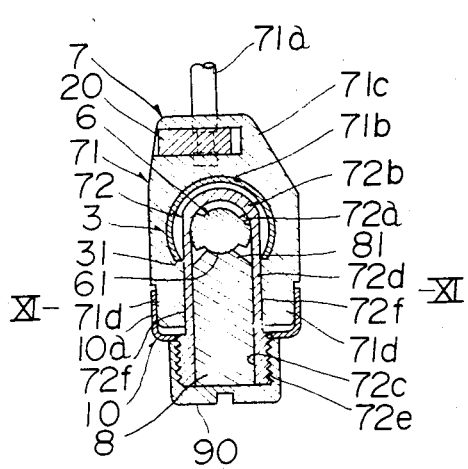
FIG. 9 is a partial longitudinal sectional view of a modified embodiment of the invention, corresponding to FIG. 1.
Figure 10:
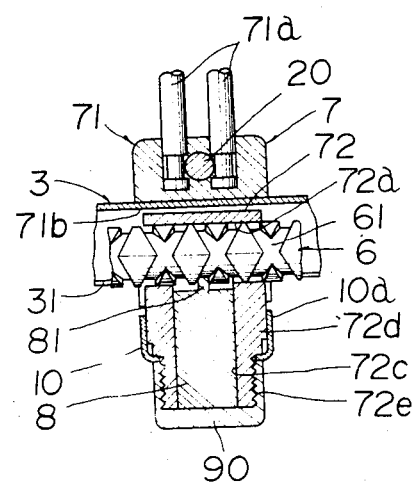
FIG. 10 is a longitudinal sectional front view of the modified embodiment in FIG. 9.
Figure 11:
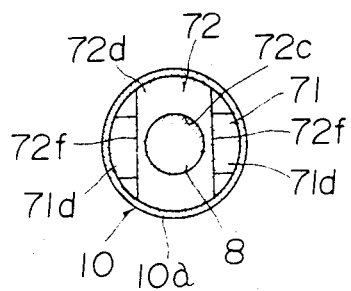
FIG. 11 is a sectional view taken on the line XI—XI in FIG. 9.

Alternatively, the coupling means may, as shown in, for example, FIGS. 9 through 11, be formed of a substantially cup-shaped coupling member 10 separate from both the guide members 71 and 72 and having a fitting portion 10a to be fitted on the outside of the bifurcate portion 71d at the outer guide member 71 and a non-round center bore into which the holding portion 72d at the inner guide member 72 can be fitted. Holding portion 72d is fitted into the center bore and the fitting portion 10a is fitted onto the bifurcate portion 71d abutting against the flat surfaces 72f at the holding portion 72d, thereby coupling both the guide members 71 and 72 with each other and screwably engaging a cap 90 with the threads 72e at the holding portion 72d.

Also, the slider 8 comprises a pin having at one end an engaging projection 81 engageable with the traverse grooves 61. The slider 8 is fitted into the fitting bore 72c at the holding portion and positioned by the bottom surface of the cap 9 or 90 with respect to the traverse grooves 61, thereby holding the slider 8 by the cap 90.

In addition, in the drawings, reference numeral 20 designates a mounting pin for mounting the fishing line guide unit 71a non-removably to the cylindrical portion 71c, reference numeral 30 designates a tubular auxiliary guide member provided across side frames 1 and 2 and having a guide groove 30a to guide the utmost ends of the fishing line guide unit 71a, and reference numeral 40 designates a guide gear provided at one axial end of the level wind shaft 6 and associated with the drive mechanism.

In the present invention constructed as described above the fishing line wound onto the spool is drawn out therefrom through the fishing line guide unit 71a at the fishing line guide 7. When a hooked fish is drawn in, the handle is operated to rotate the spool and level wind shaft 6 through the drive mechanism to thereby guide the line onto the spool by moving the fishing line guide 7 in reciprocation axially of the tubular shaft 3 and level wind shaft 6.

The fishing line guide 7 is subjected to the load applied to the fishing line when the hooked fish is drawn in, but disperses the load to the guide shaft 3 and level wind shaft 6 because the guide 7 is supported to them, thereby improving the supporting ridigity of the guide 7. Hence, the guide shaft 3 can be reduced in diameter and the fishing reel can be small-sized and lightweight to that extent. Moreover, the fishing line guide 7 is supported at two points as described above so that the fishing line guide 7, even when reduced in axial length, can be axially inclined to a minimum, thereby enabling the fishing line guide 7, and in turn the entire fishing reel, to be further small-sized and lightweight. Also, the load transmitted from the fishing line guide 7 in part to the guide shaft 3 and level wind shaft 6 can be reduced, thereby enabling the guide shaft 3 and level wind shaft 6 to be improved in durability.

Since the slider 8 is held to the inner guide member 72, the slider holding portion 72d provided at the inner guide member 72 is easy to process with high accuracy to be in alignment with the axis of the level wind shaft 6, whereby a length from the axis of the fitting bore 72a to the end face of the holding portion 72d is easy to obtain with high accuracy. As a result, the slider 8 held in the holding bore 72c at the holding portion 72d can be reliably positioned with respect to the traverse grooves 61.

Figure 1:
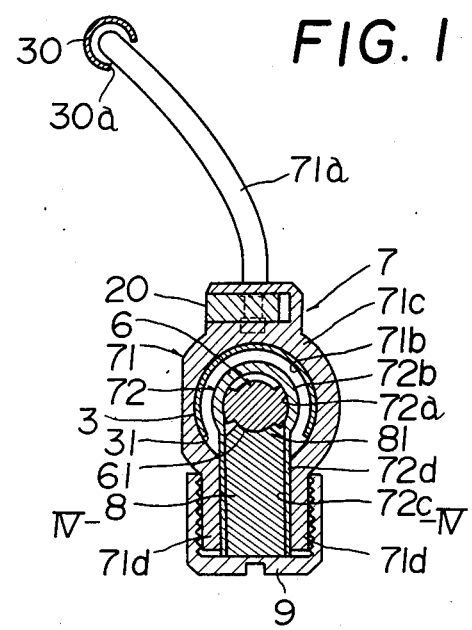
FIG. 1 is a longitudinal sectional view of an embodiment of a fishing line guide device of the present invention.

Also, the first embodiment in FIGS. 1 and 2 has a gap between the end face of the slit 31 at the guide shaft 3 and the outer guide member 71. Alternatively, the cylindrical portion 71c at the outer guide member 71 may, as shown in FIG. 9, be provided with a swollen portion which receives the end face of the slit 31, whereby the outer guide member 71 can further effectively eliminate its backlash.

Although several embodiment has been described, they are merely exemplary of the invention and not to be construed as limiting, the invention being defined solely by the appended claims.

I claim:

1. A fishing line guide device for a fishing reel, comprising a tubular guide shaft; a level wind shaft supported rotatably within said guide shaft and having at its outer periphery traverse grooves; a fishing line guide comprising an outer guide member supported movably in reciprocation onto said guide shaft and having at one radial side thereof a fishing line guide unit, an inner guide member supported movably in reciprocation by said level wind shaft and comprising a cylindrical portion having a fitting bore fitted slidably onto the outer periphery of said level wind shaft and a holding portion extending from said cylindrical portion in a direction perpendicular to the axis of said fitting bore, said holding portion having a bore formed therein, and coupling means for coupling said outer guide member with said inner guide member to thereby make said outer and inner guide members non-rotatable relative to said guide shaft and level wind shaft respectively; and a slider held in said fitting bore of said holding portion of said inner guide member and having an engaging projection engageable with said traverse grooves.

2. A fishing line guide device for a fishing reel according to claim 1, wherein said fishing line guide unit comprises linear members and an auxiliary fishing line guide member is provided at an utmost end of said fishing line guide unit, said auxiliary fishing line guide member extending in parallel to said guide shaft and having a guide groove for guiding therethrough the utmost end of said fishing line guide unit.

3. A fishing line guide device for a fishing reel according to claim 1, wherein said outer guide member is provided with a cylindrical portion having a fitting bore fitted slidably onto the outer periphery of said guide shaft and a bifurcate portion extending from one radial side of said cylindrical portion reversely to said fishing line guide unit, and said inner guide member is provided with a cylindrical portion having a fitting bore fitted slidably onto the outer periphery of said level wind shaft and a holding portion having a holding bore for said slider, said holding portion being provided at its outer periphery with partial screw threads and a pair of flat surfaces abutting against the inner surfaces of said bifurcate portion, said partial screw threads screwing with a cap holding said slider.

4. A fishing line guide device for a fishing reel according to claim 3, wherein said bifurcate portion at said outer guide member extends to a position where said cap screws with said holding portion screwable therewith at said inner guide member, so that said cap screws with said partial screw threads at said holding portion, thereby coupling said outer guide member with said inner guide member.

5. A fishing line guide device for a fishing reel according to claim 3, provided with a coupling member which has a fitting portion fitted onto the outside surfaces of said bifurcate portion at said outer guide member and a center bore into which said housing portion at said inner guide member is insertable, said coupling member being held by said cap screwable with said partial screw threads, thereby coupling said outer guide member with said inner guide member.

* * * * *